June 10, 1958 J. R. WATSON 2,838,722

SEMICONDUCTOR DEVICE

Filed June 4, 1957

INVENTOR.
John R. Watson
BY
Barlow & Barlow
ATTORNEYS.

United States Patent Office 2,838,722

Patented June 10, 1958

2,838,722

SEMICONDUCTOR DEVICE

John R. Watson, Bristol, R. I., assignor to B. A. Ballou & Co. Incorporated, a corporation of Rhode Island Application June 4, 1957, Serial No. 663,376

4 Claims. (Cl. 317—235)

This invention relates to a semiconductor device and more particularly to one which has power handling capabilities.

In devices of this sort, it has been found that the semiconductor material generates a considerable amount of thermal energy. If this thermal energy is not dissipated, the electrical properties of the semiconductor material will eventually be destroyed leading to instability and a collector runaway effect. It has been the practice in the industry to mount the semiconductor material on a rather large piece of material, generally copper, which will successfully dissipate the thermal energy that is generated to the metallic chassis upon which the entire device is mounted. In the prior devices with which I am familiar, this copper piece or plate which is also referred to as a heat sink has been employed for the base of the device and has taken the form of a generally diamond shape oppositely pierced to receive fastening means such as a screw threaded bolt. A steel ring is brazed to the base at the mid portion thereof in order to provide a proper seat for a resistance type of welding of a cap which protects the semiconductor material and also provides a seal to the atmosphere therefor. Leads to the semiconductor material are generally brought out through openings in the base, and the openings are sealed by a suitable material such as glass or the like. Since the base must be of a size to provide for fastening the device in place, it will be apparent in these prior devices that a considerable amount of copper is utilized in the construction thereof. In the normal case, the device is mounted on a radio chassis which is made of relatively thin metal which is easily distorted to provide other than a perfectly flat surface. Because of the base being mounted directly on the chassis, it has been found that it is sometimes difficult to effect contact with the chassis for heat conduction contact.

One of the objects of this invention is to reduce the amount of material utilized for the heat sink.

It is a further object of the invention to provide a mounting means for the entire device which will effect a better contact between the mounting plate and the heat sink device so that a better heat conduction is had.

A further object of the invention is to simplify the assembly procedure for the parts of the device.

A further object of the invention is to provide a sheet metal mounting means for the semiconductor device.

A further object of the invention is to reduce the cost of manufacturing the semiconductor device.

With these and other objects in view, the invention consists of certain novel features of construction, as will be more fully described and particularly pointed out in the appended claims.

In the accompanying drawings:

Fig. 1 is a top view of the semiconductor device mounted on an electronic chassis or the like;

Figure 1:
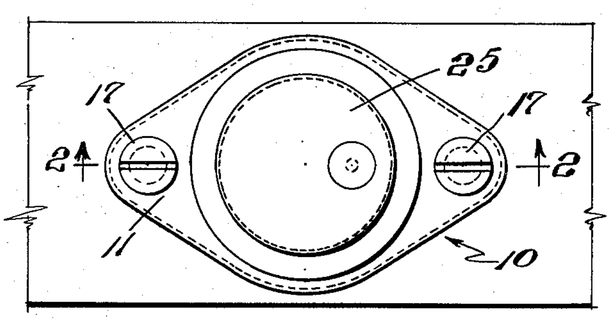
Figure 2:
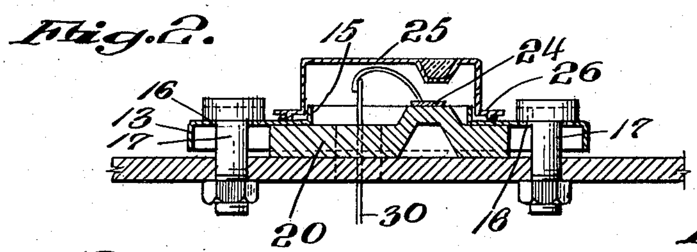
Fig. 2 is a section taken on line 2—2 of Fig. 1.
Figures 3, 4:
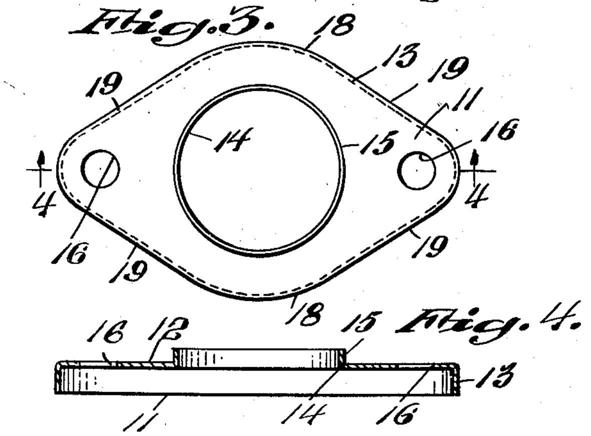
Fig. 3 is a plan view of the mounting flange.
Fig. 4 is a section taken on line 4—4 of Fig. 3.
Figures 5, 6, 7:
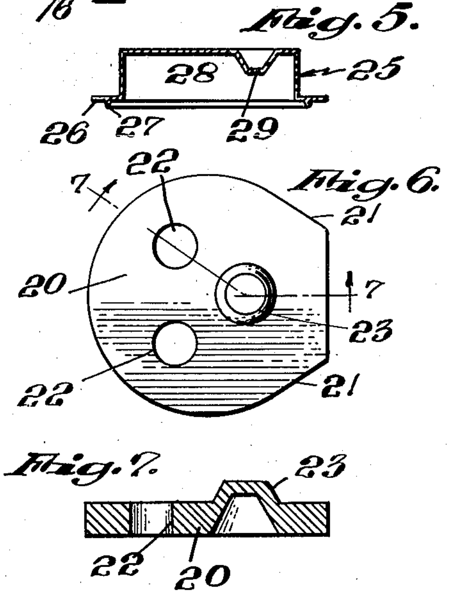
Fig. 5 is a sectional view of the cap.
Fig. 6 is a plan view of the preferred form of heat sink.
Fig. 7 is a sectional view taken on line 7—7 of Fig. 6.

Referring to the drawing in more detail, 10 designates generally a semiconductor device having a sheet metal mounting flange 11 having a top wall 12 and depending side walls 13 extending along the periphery thereof. The flange 11 has a central circular opening 14 therethrough which is preferably surrounded by an upstanding annular lip 15 at the edge thereof. The end portions of the flange 11 in the longitudinal direction thereof are pierced as at 16 for receiving screw threaded bolts 17 or the like for attaching the device in position. The flange is made from suitable relatively thin sheet metal in the known manner, as by way of example, by a progressive series of piercing, blanking and drawing operations. The flange is of general diamond shape, the middle peripheral edge portions 18 of which extend on an arc of a circle described from the point of intersecting of the longitudinal and transverse axis of the base. The converging peripheral edges 19 of the flange extend tangential from the said arc portions.

The heat sink 20 is a flat copper plate which has a peripheral edge that extends for the greater portion thereof on a curvature of a circle complemental to the peripheral arcuate edge of the flange and then extends on a taper as at 21 for a short extent complemental to the sides 13 of the flange. The sink is received within the flange to engage against the sides 13 thereof and bottoms against the top wall thereof, the tapered end 21 of the sink locating the sink into proper relation within the flange. The heat sink is provided with two holes 22 therethrough for the passage of electrical leads and has a struck portion 23 having a cross section that simulates a truncated cone which provides a mounting for the semiconductor material 24. A mounting flange 11 is preferably secured to the sink 20 by hard soldering to effect a rigid joint between the two. Other methods, of course, could be used, although soldering has been found superior.

A cap 25 which has lower rim portions 26 is adapted to seat on the mounting flange and is provided with an annular V-shaped bead 27 centrally disposed of the rim 26. Additionally, a small depression 28 is provided in the top of the cap with an orifice 29 therethrough for the purpose of evacuating the structure when completely assembled. Assembly of the cap to the flange is preferably effected by resistance welding, the resistance welding being applied at the location of the annular bead 27 so as to effect a joint at that location between the cap and the flange.

Figure 8:
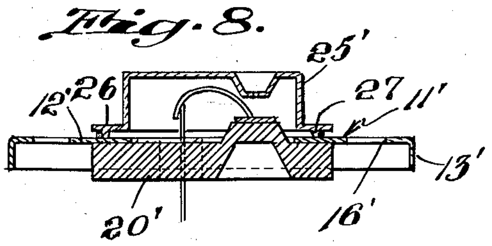
Fig. 8 is a sectional view similar to Fig. 2 of a modified form of the device.

It quite often happens that during a resistance weld operation splattering will occur, that is, the material which has been heated to fluid condition will tend to disperse in small globules. This is generally felt to be an undesirable result of welding and also of certain other operations such as soldering or the like. Therefore, the presence of the lip 15 will prevent the metal from being dispersed into the interior of the semiconductor enclosure formed between the heat sink and the cap. At certain times, of course, with certain types of sealing methods, it is not absolutely necessary that the lip 15 be provided; and to that end, the device may take the form as shown in Fig. 8 in which like parts have like reference numerals primed.

It should be noted that the tapered edge 21 of the heat sink effectively mates with the converging peripheral edge 19 of the flange in a manner so that the heat sink will centralize itself with the flange. This is important in positioning operations where it is desired to have uniformity of the locations of the lead holes 22 with respect to the mounting holes 16. It should be understood, of course, that suitable leads such as 30 are provided from the sensitive contact region of the semiconductor device 14, there being shown here two in number in the present device which may be referred to as a transistor.

Of further importance is the fact that the thin stock of the flange 10 forms a resilient mounting for the heat sink against a radio chassis. This comes about since the side walls 13 are of a dimension less than the thickness of the sink 20 so that when the fastening means such as bolts 17 are tightened, the overhanging portion of the flange will act as a spring urging the sink to the chassis thereby effecting a better heat conductive connection thereto than possible with existing devices.

I claim:

1. A semiconductor device comprising a heat sink of high thermal conductivity, a mounting flange for said sink, said flange having a central cut-out portion smaller than the outline of said sink and mounting ears extending beyond the periphery of said sink, said flange being secured to said sink on one face thereof, a cap secured to said flange around said cut-out portion, a semiconductor affixed to said sink and point contact elements therefor engageable in a contact region, leads extending from said contact region and sealed through the enclosure formed by said sink and cap.

2. A semiconductor device as in claim 1 wherein an upstanding wall surrounds said cut-out portion to prevent contamination of said enclosure during the cap securing step.

3. A semiconductor as in claim 1 wherein said flange has depending peripheral sides generally surrounding said sink, said sides having a dimension less than the thickness of said sink to establish a spring action between said ears and said sink when the device is secured to a surface through said mounting ears.

4. A semiconductor device comprising a heat sink of high thermal conductivity, a mounting flange encircling said sink and secured thereto, said flange having mounting ears free of the outline of said sink and an upstanding lip encircling said sink within the outline thereof, a cap encircling said lip and secured to said flange, semiconductor and point contact elements arranged within the area enclosed by said cap and engageable in a contact region, leads extending from said contact region and sealed through said heat sink.

References Cited in the file of this patent

UNITED STATES PATENTS

| | | |
|---|---|---|
| 2,634,323 | Pantchechnikoff | Apr. 7, 1953 |
| 2,704,340 | Baird | Mar. 15, 1955 |

FOREIGN PATENTS

| | | |
|---|---|---|
| 755,440 | Great Britain | Aug. 22, 1956 |